United States Patent
Morgan et al.

[11] Patent Number: 5,975,106
[45] Date of Patent: Nov. 2, 1999

[54] ROTARY ACTUATOR VALVE CLOSURE APPARATUS

[76] Inventors: Douglas A. Morgan, 3719 Edgehill Cir. N.W., Canton, Ohio 44709; Edward J. Turk, 6962 Carol Dr., Independence, Ohio 44131

[21] Appl. No.: 08/986,922

[22] Filed: Dec. 8, 1997

Related U.S. Application Data

[63] Continuation-in-part of application No. 08/743,195, Nov. 5, 1996, Pat. No. 5,694,960.

[51] Int. Cl.⁶ .................................................. F16K 17/36
[52] U.S. Cl. .............................. 137/78.5; 251/14; 251/59; 251/30.01
[58] Field of Search ........................ 137/78.5; 251/30.01, 251/31, 14, 59, 61

[56] References Cited

U.S. PATENT DOCUMENTS

| | | | |
|---|---|---|---|
| 3,752,041 | 8/1973 | Smith ........................................ | 251/59 |
| 3,845,783 | 11/1974 | De Lepeleire ............................ | 251/61 |
| 3,945,565 | 3/1976 | Lynch et al. .............................. | 251/61 |
| 3,955,186 | 5/1976 | Green et al. ............................. | 137/78.5 |
| 5,101,862 | 4/1992 | Leete . | |
| 5,181,452 | 1/1993 | Immega . | |
| 5,211,195 | 5/1993 | Hamos . | |
| 5,427,350 | 6/1995 | Rinkerwich ............................. | 251/30.01 |
| 5,579,801 | 12/1996 | Pye et al. .................................. | 251/58 |

*Primary Examiner*—A. Michael Chambers
*Attorney, Agent, or Firm*—Joseph H. Taddeo

[57] ABSTRACT

The present invention relates to a novel single acting, valve closing actuator that when actuated is capable of closing an attached existing plug or gate valve, one that opens and closes within one quarter turn of operation. The newly designed actuator is cylindrically quadrant shaped and utilizes an extensible air bladder to actuate an internal rigid vane, causing the attached vane shaft to rotate, thereby closing a connected existing valve. In the preferred embodiment, the air bladder is comprised of a laminate of silicone rubber bonded to an exterior coating made of Kevlar. In an alternative embodiment, two air bladders are used to provide a double acting actuator, where a remote valve reset can be accomplished. Independent stand-alone operation is provided by using a pressurized source of $CO_2$ to inflate the air bladder and a rechargeable battery to operate the air solenoids.

30 Claims, 7 Drawing Sheets

ROTARY ACTUATOR VALVE CLOSURE APPARATUS

REFERENCE TO PREVIOUSLY FILED APPLICATIONS

This application is a continuation-in-part of the prior patent application of Douglas A. Morgan and Edward J. Turk, identified by Ser. No. 08/743,195, Titled A HAZARDOUS GAS PROTECTION SYSTEM AND METHOD FOR AUTOMATIC VALVE CLOSURE, filed Nov. 5, 1996. now U.S. Pat. No. 5,694,960. Benefit of the filing date for original disclosure material in the parent domestic application is claimed under 35 USC 120 and 37 CFR §1.53.

FIELD OF INVENTION

The present invention relates generally to a valve closure device and more particularly, to a novel rotary actuator, valve closure apparatus, having an expandable chamber containing an inflatable air bladder, that utilizes a pneumatically driven vane and that mounts directly on an existing fluid control valve.

BACKGROUND OF THE INVENTION

In today's environment, there are many hazardous conditions that may exist. Some of these hazardous conditions are attributed to equipment failure where there is a fault as a result of incomplete combustion of natural gas, which can result in the undesirable atmosphere of carbon monoxide gas.

Other hazards may include the inadvertent release of combustible gases, such as, propane, methane, hydrogen or natural gas, which when released into the atmosphere can create a hazardous explosive environment. The risk of creating an explosive atmosphere increases substantially when these gases are mixed with the oxygen found in air.

Still other hazards can be created by natural cataclysmic events, such as, earthquakes that can shift the foundation of buildings and residences, causing pipelines and pipeline connections to rupture and leak to the atmosphere.

Some other hazards can be created by accident. Hazardous conditions have been created in events where, for example, an automobile careens into a gasoline pump in a gas station, shearing it off, causing a substantial amount of gasoline to be released into the surrounding area.

Many systems that function to close the flow of a fluid substance do not provide for stored energy to operate an actuator during a cataclysmic event, such as caused by fire or flooding.

There is a particular need for apparatus that will rapidly and reliably shut down the flow of a product, such as a fluid, liquid or gas, into the atmosphere in the event of an accidental or even a natural cataclysmic disaster to protect life and property.

There are several patents that disclose various pneumatically or hydraulically operated actuators that are used to remotely control and operate these valves.

U.S. Pat. No. 5,211,195, granted May 18, 1993, to R. E. Hamos, discloses a fluid valve having a valve housing defined as a corner. The valve opening is initiated by moving the pilot valve away from the aperture in the expandable valve closing member, and as such, the opening of the valve is completed by pulling the expandable valve closing member away from its valve seat.

U.S. Pat. No. 5,181,452, granted Jan. 26, 1993, to G. Immega, discloses a linear bellows actuator that is expandable and contractible along the axis by flexure of the wall portions relative to one another about the fold lines in response to the pressure changes occurring within the bellows chamber.

U.S. Pat. No. 5,101,862, granted Apr. 7, 1992, to B. C. Leete, discloses a hydraulic oscillatory rotary actuator for controlling an adjustable valve. The chamber housing and the chamber wall form a rotary chamber for the arcuate movement of the depending vane or rotary piston.

As can be seen from the discussion of the previous prior art, a specialized need exists for a safe and reliable pneumatically actuated valve actuator that uses its own standby pressure source which can be remotely operated even during a power failure.

SUMMARY OF THE INVENTION

The present invention relates to apparatus that is used to remotely close an existing plug valve or gas cock. These valves are normally opened or closed by rotating the valve stem ninety degrees. Reliable valve closure is required to shut off the flow especially when an emergency hazardous condition is detected.

The newly designed single acting rotary actuator is capable of providing a full ninety degrees of rotation when mounted on an existing valve; one that can be operated from a fully open to a fully closed position by the arcuate movement of its rotary piston. Typically, an existing valve is preferably one that that requires ninety degrees of rotation to open or close the valve. Thus, the present invention is capable of operating a valve having a quarter turn from its open to close position, such as a gate valve or ball valve, or the like.

The components of the rotary actuator are contained in a metal housing that supports a central shaft that engages the valve stem of the remotely controlled valve. Rigidly attached to this central shaft is a rigid vane that controls the positioning of the operating shaft. A specialized wedge shaped expandable air bladder that is mounted between the metallic vane and the wall of the enclosure, when pneumatically inflated, causes rotation of the vaned shaft by increasing the volume of the expandable rotative chamber.

When a hazardous condition is detected, a solenoid valve opens, releasing a stored volume of carbon dioxide to inflate the expandable air bladder, which in turn applies an actuating force to the vane to cause rotation of the driving shaft, causing a gas cock or plug valve to close, thereby stopping the flow of the hazardous substance.

The actuator system, when properly installed, is self sufficient and self sustaining by being operated from a pressurized tank containing compressed carbon dioxide. The electrically operated solenoid valves are powered from a 12 volt battery. The battery remains in a fully charged state by a wall mounted trickle charger.

In another aspect of the present invention a second expandable air bladder can be installed to form a double acting rotary actuator. This arrangement will allow the system not only to perform a remote valve closure, as with the apparatus previous disclosed, but also to provide a remote reset by re-opening the valve after the hazardous condition is corrected.

It is therefore an object of the present invention to provide an improved valve actuation system that mounts to an existing valve to remotely operate it, especially, to close it when a hazardous condition is detected.

It is another object of this invention to provide for an improved valve actuating system that is comprised of a wedged shaped expandable air bladder, when inflated, forms an expandable chamber to actuate a rigid vane, which in turn rotates the driving shaft to close an existing valve.

Yet, it another object of this invention to provide an improved valve actuating system that is powered by a pneumatic pressurized source to remotely operate a rotary pneumatic actuator even during a catastrophic power failure.

Still another object of this invention is to provide an improved valve actuating system that is manually reset to restore the flow of fluid after the fault has been corrected.

It is a final object of this invention to provide an improved valve actuating system that is reliable in operation and is cost effective to manufacture, install and maintain.

These and other objects and advantages of this invention will become more apparent from the detailed description that follows with accompanying drawings. The following example represents only one embodiment and after considering this example, those who are skilled in the art will understand that other changes and variations can be made without departing from the true spirit of this invention.

One such example of an alternate embodiment is the use of two pneumatically operated expandable air bladders to provide a double acting actuator; one that is capable of being reset remotely, to restore the flow of fluid through the existing valve.

The same principles that were previously discussed for rotary actuation systems also apply to the design and application of a linear actuator.

BRIEF DESCRIPTION OF THE DRAWINGS

The present invention is diagrammatically illustrated in the accompanying drawings that are attached herein.

DESCRIPTION OF THE PREFERRED EMBODIMENT

Figure 1:
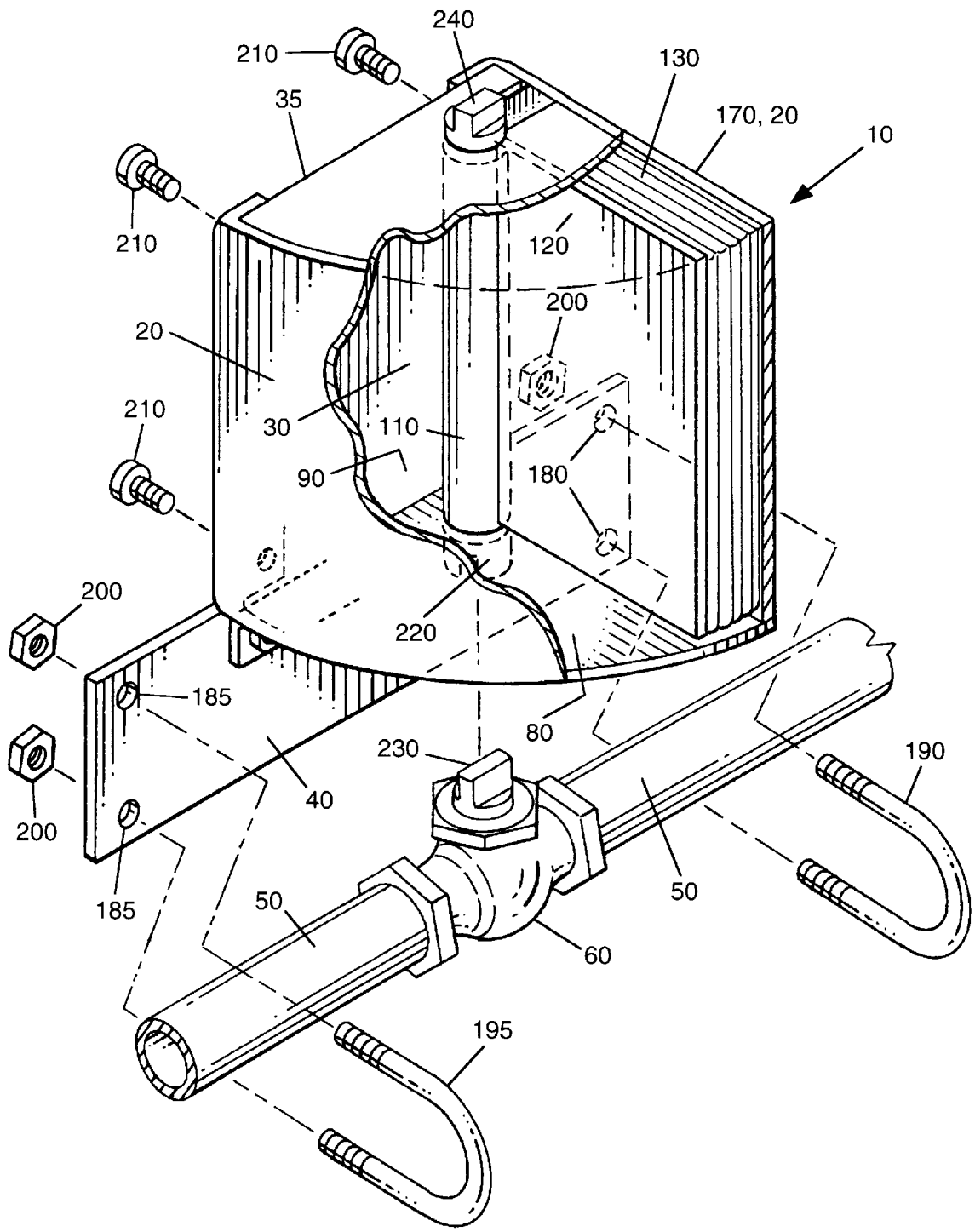
FIG. 1 is a perspective drawing that best shows the detailed construction of the improved valve actuating apparatus that is typically mounted to an existing gas cock valve. It is shown in operating position where the expandable air bladder is deflated.

Referring now to FIG. 1, shown is a perspective view of the present invention which is defined as a single-acting rotary actuator, valve closure apparatus that mounts to an existing valve, the entire apparatus being indicated as 10.

Figure 3:
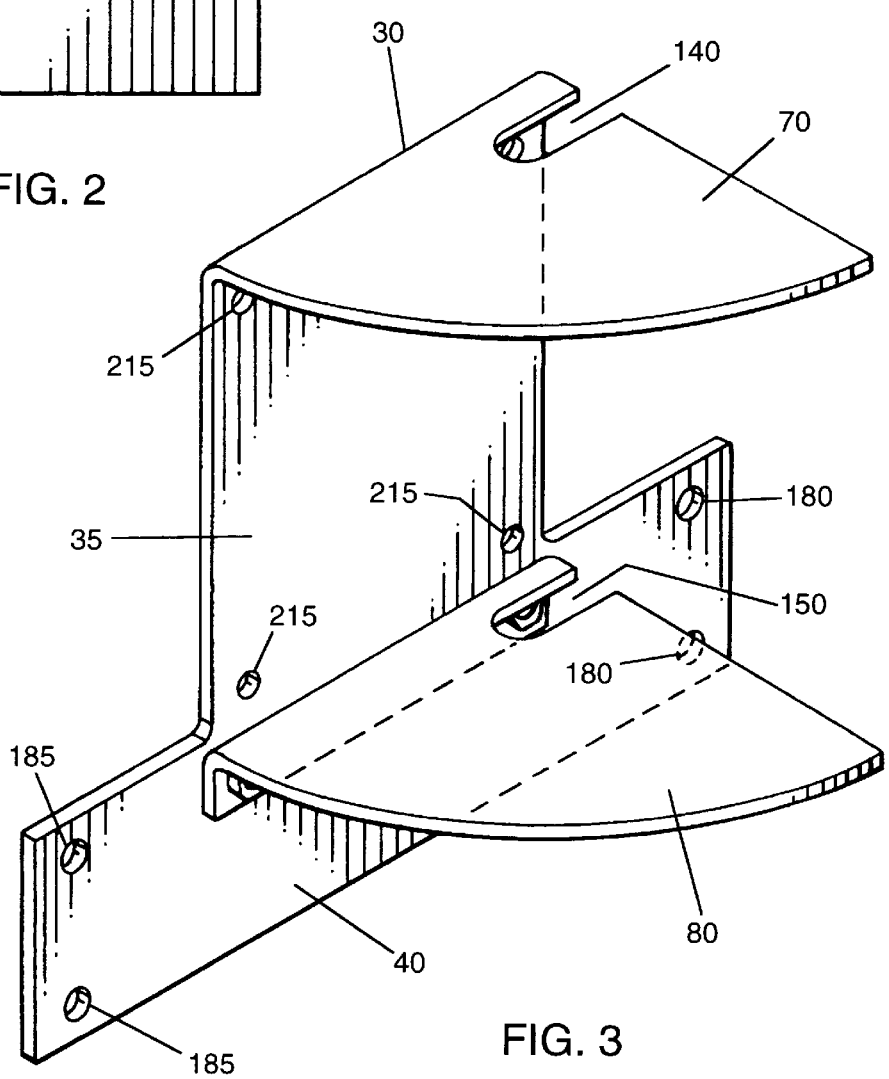
FIG. 3 is a perspective view of the actuator housing detailing the attached lower plate and mounting bracket.

The entire actuator assembly 10 of the preferred embodiment is comprised of an expandable air bladder 130, a cylindrical quadrant shaped housing member 20 that is attached to the housing support member 30, using a plurality of machine screws fasteners 210, a frame attachment member 40, a cylindrical vane shaft 110 to which is attached a rigid vane 120 and a lower quadrant plate 80. The addition of lower quadrant plate 80 completes the outer enclosure assembly, that now defines the total enclosed inner space as rotative chamber 90. The volume that is occupied by the expandable air bladder 130 is defined as the expandable rotative chamber 100, (FIG. 3).

The frame attachment member 40 mounts to an existing fluid flow pipeline 50, while straddling the in-line valve 60. The frame member 40 is formed from sheet metal where it is welded to the lower portion of housing support member 30. Located at each end of frame member 40 are two sets of holes 180 and 185, where each set of holes receive U-bolts 190 and 195, respectively, to securely mount the actuator assembly 10 to the pipeline 50 while straddling the flow valve 60. The two U-bolts 190 and 195 securely attach the frame member 40 to the existing pipeline 50, which in turn, supports the entire actuator assembly 10 by tightening the hex-nuts 200.

At the bottom of the cylindrical vane shaft 110 is a valve stem receiving slot 220 that engages the valve stem 230. Located at the top of the vane shaft 110 is parallel sided stem operator 240. In normal operation, the parallel sided stem operator 240 is used to manually reset the system by reopening the flow valve 60. A standard parallel jaw wrench can then be used to rotate the flow valve to manually open the flow valve.

In the event that a hazardous emergency condition exists where the system fails to properly close the valve when a hazardous condition is detected, a manual override can be used to close the valve. A wrench can be used to engage the parallel sided stem operator 240 to close the valve.

The expandable air bladder 130 is designed specifically to be used within the housing of the present invention. In the preferred embodiment, the expandable air bladder is a laminate made of silicone rubber and covered with a cut-resistant layer of fabric, such as Kevlar. The Kevlar fabric is quadrant-shaped and is designed and fabricated to form fit the interior space of the expandable rotative chamber 90 when the expandable air bladder is fully inflated. It is shaped with bellows like sides, such as the top, bottom and expandable side wall. In its stored position, where the interior of the expandable air bladder is deflated, as shown, the bellows like walls neatly fold, thereby, reducing the width of the expandable air bladder as it rests between the vane 120 and the upstream side wall 170 of the quadrant shaped enclosure 20.

When an emergency condition is detected, stored compressed gas, such as carbon dioxide is released into the expandable air bladder inlet 135, thereby inflating the Kevlar-silicone expandable air bladder. As the expandable air bladder inflates, the pleated bellows unfold, causing the vane 120 to rotate. The vane 120, being rigidly secured by welding to shaft 110, causes the vane shaft 110 to rotate in the direction of valve 60 closure. Because vane slot 220 is in full engagement of valve stem 230, the resulting action shuts off the delivery of the fluid flowing through existing valve 60. During the inflation and expansion of the expandable air bladder, it is guided rotatively by the enclosure side wall of housing 20. When the expandable air bladder is fully inflated, the expandable air bladder expands to fully occupy the interior expandable cavity 100 of the rotative chamber 90, to its entirety and the vane comes to rest against the vertical wall of actuator housing member 35 of housing support member 30.

Figure 2:
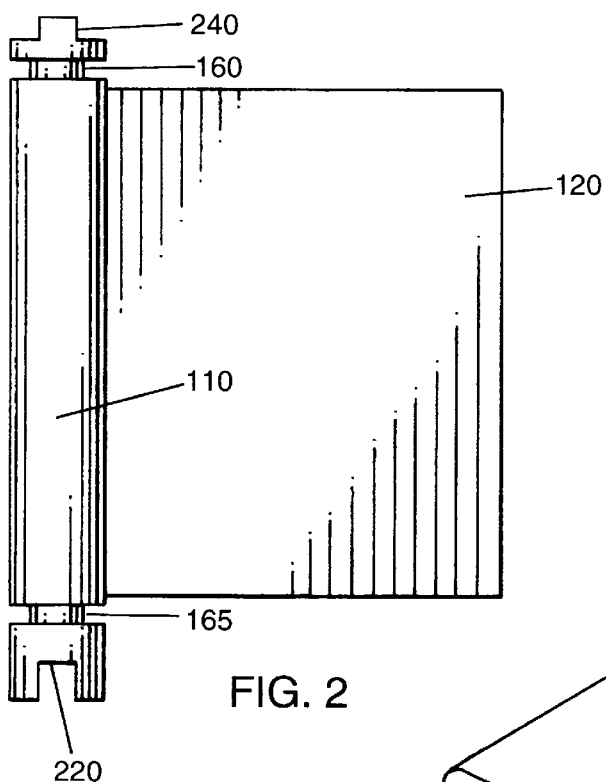
FIG. 2 is a side elevation drawing of the metallic vane attached to the rotational shaft.

Turning now to FIGS. 2 and 3, detailed is the rigid vane 120 that is rigidly attached to the cylindrical vane shaft 110, preferably by being welded to it. Located at the top of the vane shaft is an upper annular groove 160 that when the apparatus assembled is captivated by the mating upper bearing slotted hole 140. Found near the bottom end of the vane shaft is a lower annular groove 165 that when the apparatus is assembled is retained by the mating lower bearing slotted hole 150. The upper bearing slotted hole 140 is found in the upper quadrant surface 70 and the lower bearing slotted hole 150 is found in the lower quadrant plate 80.

At the extreme lower end of the vane shaft is a slot 220 that is sized to receive the valve stem 230 of the existing valve 60. A manual means to reset the system is provided by rotating the parallel sided stem operator 240, (FIG. 6), by placing a parallel jawed wrench on it to manually open the valve. This stem can also be used to provide a protective manual over-ride to manually close the valve in the event of a system failure.

Figure 4:
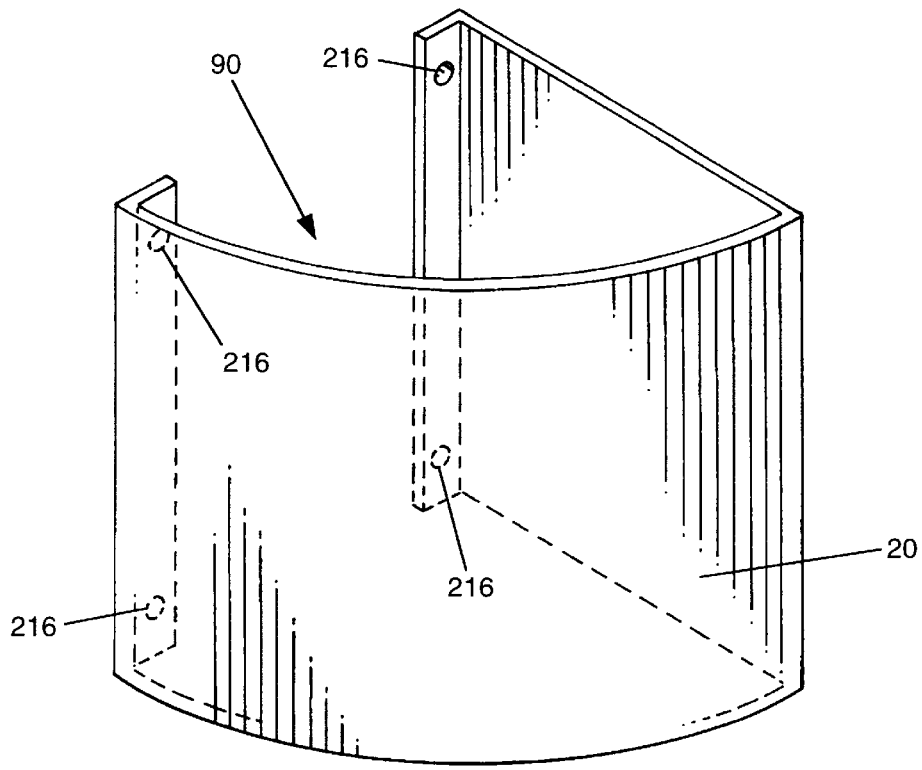
FIG. 4 is a perspective view of the actuator cover plate that forms the chamber to confine the expandable air bladder when once deployed.

Referring to FIG. 4, a perspective view of the actuator cover, illustrated is the quadrant shaped housing member 20 that forms the vertical portion of the rotative chamber 90 that confines and guides the expansion of the expandable air bladder 130 when once deployed. Clearance holes 216 are provided to secure the quadrant shaped housing member 20 to the housing support member 30 using machine screws fastener 210.

Figure 6:
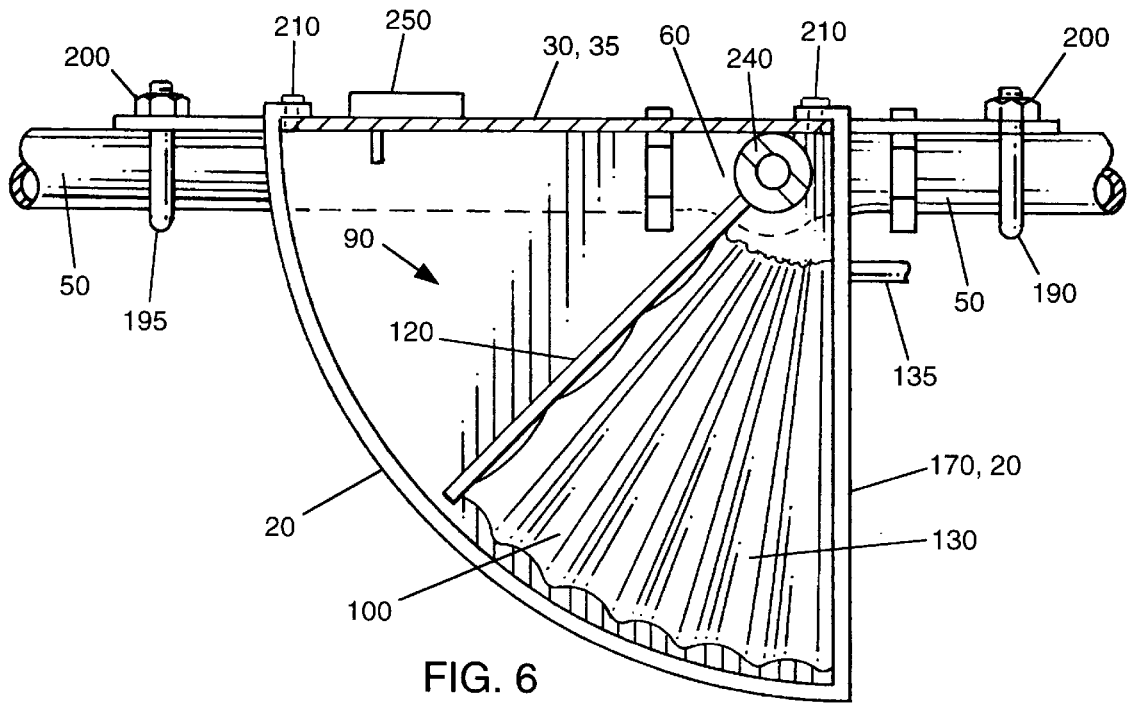
FIG. 6 is a top elevation that shows the detailed construction of the improved valve actuating apparatus in a position where the expandable air bladder is partially inflated.
Figure 5:
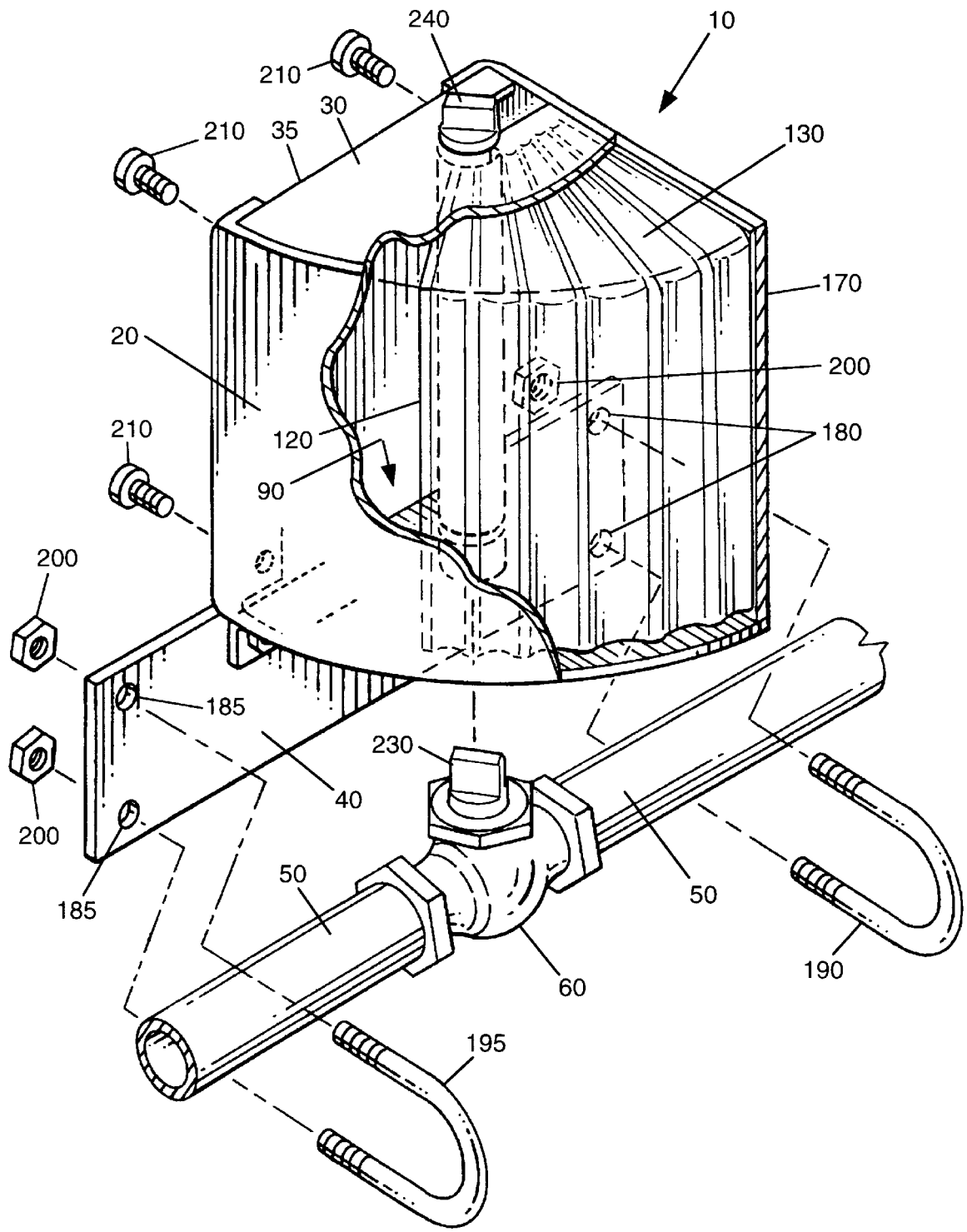
FIG. 5 is a perspective drawing that shows the detailed construction of the improved valve actuating apparatus in a position where the expandable air bladder is partially inflated.

FIGS. 5 and 6 best show the present invention where the expandable air bladder 130 is partially inflated. Upon inflation of the expandable air bladder, the expandable volume 100 that is occupied by the expandable air bladder, increases, thereby exerting a force acting upon the rotary vane 120, the force being:

$$F = p \times A \text{ where:}$$
$$F = \text{force in lbf.}$$
$$p = \text{pressure in lb./in.}^2$$
$$A = \text{area in in.}^2$$

Also, the torque applied to operate the valve stem is:

$$T = (w^2 \times p \times A)/2 \text{ where:}$$
$$T = \text{torque in in.-lbs.}$$
$$w = \text{width of vane in in.}$$
$$p = \text{applied pressure in lb./in.}^2$$
$$A = \text{area in in.}^2$$

By the force that is exerted upon the vane 120, the arcuate movement of the vane shaft 110 that is coupled to the valve stem 230 via slot 220, cause valve 60 to begin to close.

Figure 7:
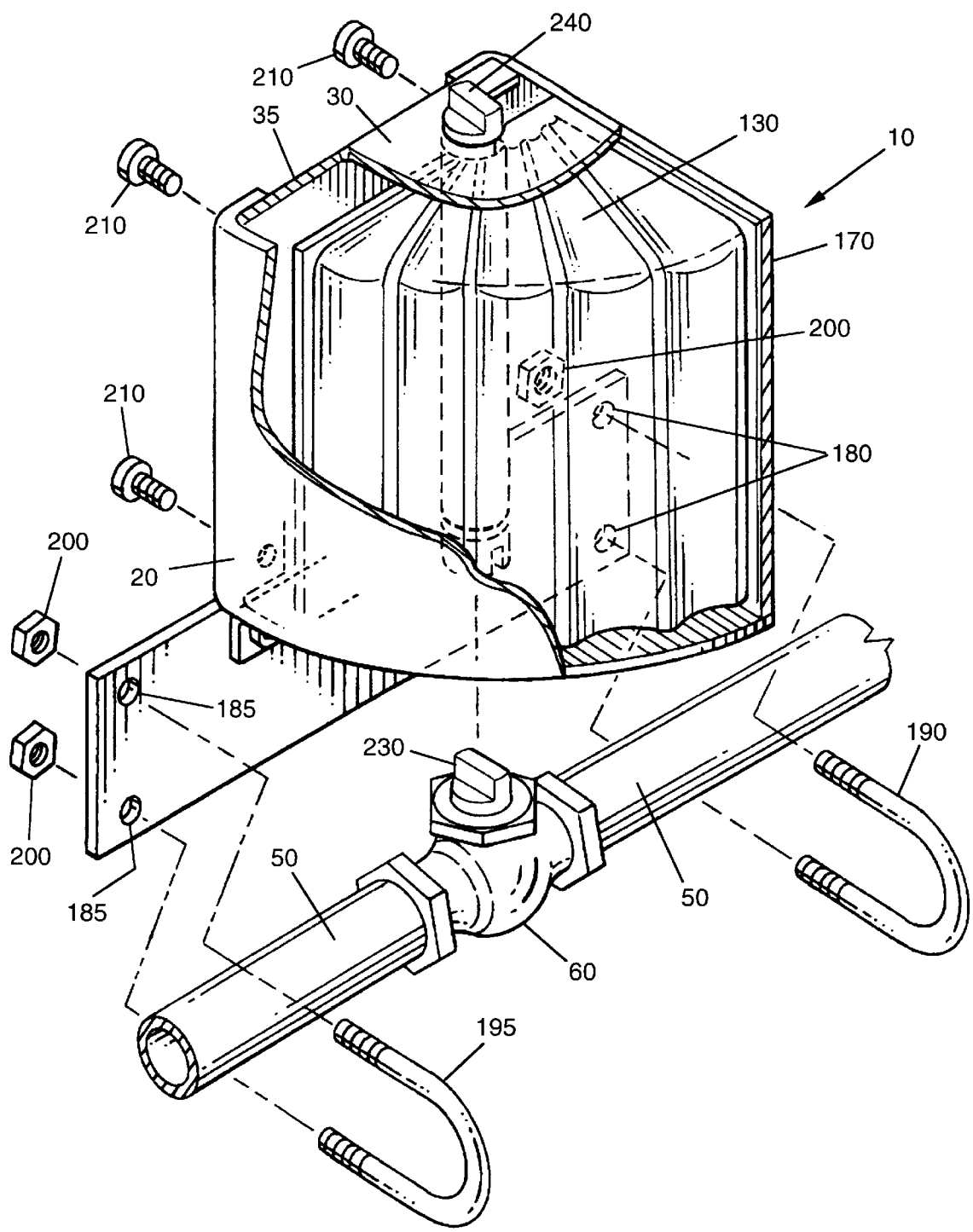
FIG. 7 is a perspective drawing that shows the detailed construction of the improved valve actuating apparatus in a position where the expandable air bladder is fully inflated and the valve is in a fully closed position
Figure 8:
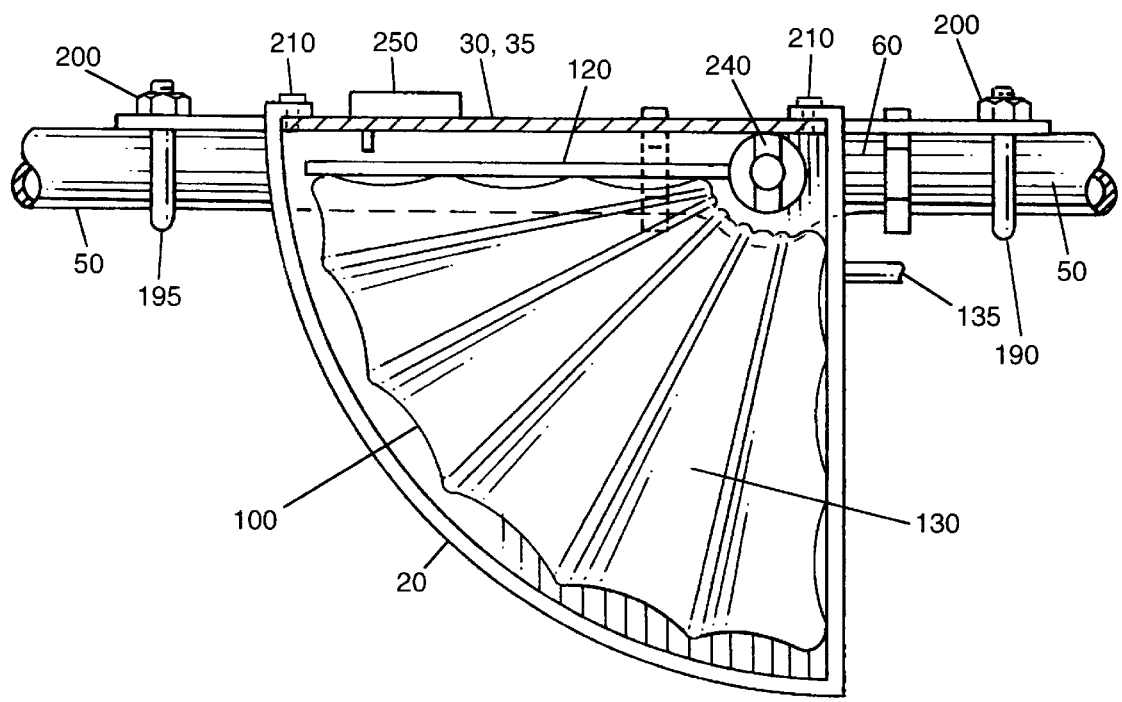
FIG. 8 is a top elevation that shows the detailed construction of the improved valve actuating apparatus in a position where the expandable air bladder is fully inflated and the valve is in a fully closed position.

As shown in FIGS. 7 and 8, the vane 120 is in a position where the expandable air bladder is fully inflated and the valve 60 is in a fully closed position. When the expandable air bladder is fully inflated, the position of the vane 120 is sensed by travel limit switch 250, that terminates the flow of pressurized fluid into the bladder 130.

Figure 9:
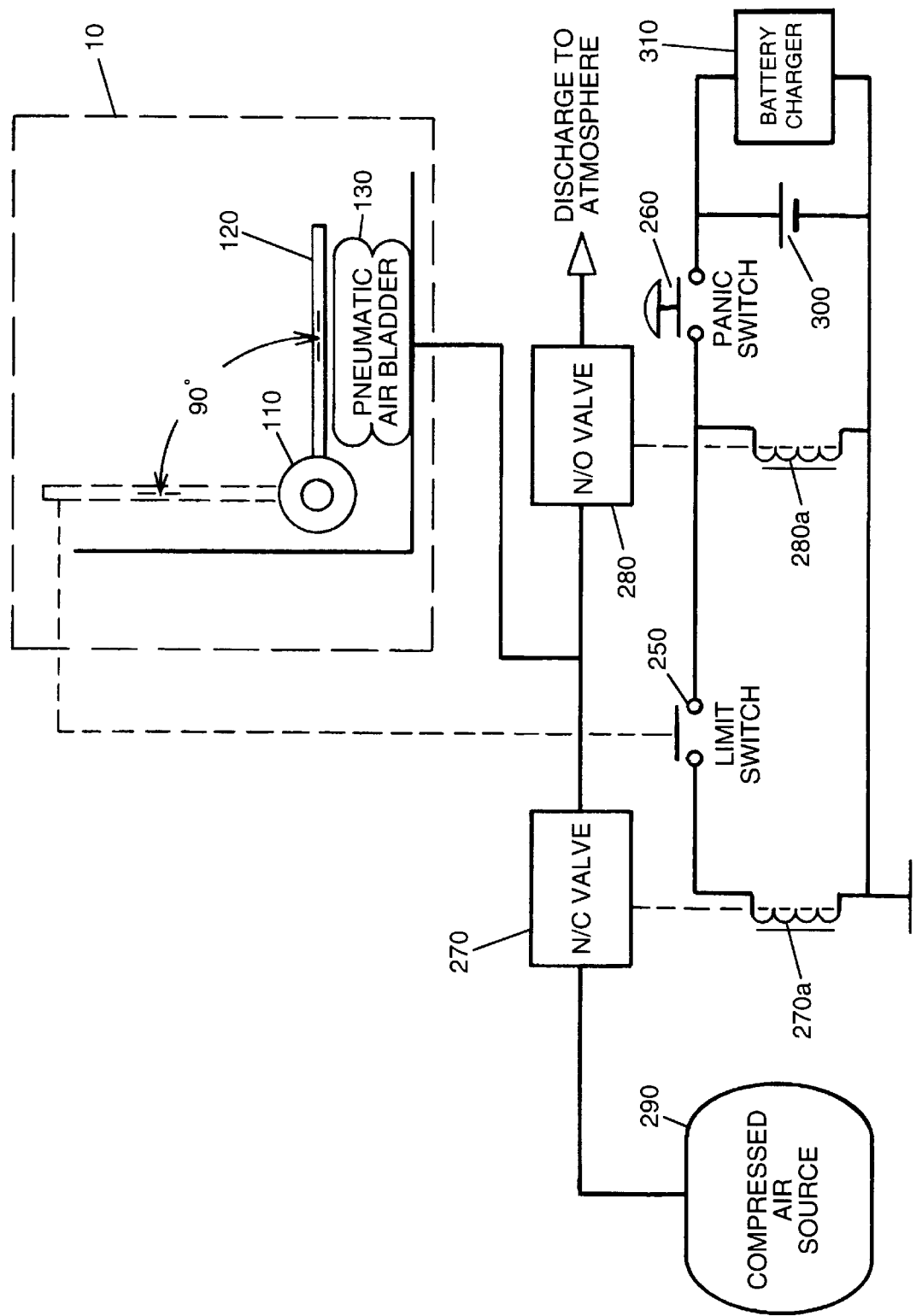
FIG. 9 is a diagram that shows schematically the peripheral components to install and operate a single acting actuator.

Referring to FIG. 9, the schematic drawing shows an electro-pneumatic representation that is typical of the control for the actuation system. The entire valve actuation system is remotely powered by a standby energy system of both, a pressurized vessel 290, containing $CO_2$ and a rechargeable battery 300. The charge on the rechargeable battery 300 is maintained by a trickle charger 310. The compressed air source 290 supplies the energy to operate the valve actuator 10 and the rechargeable battery 300 supplies the electrical power to operate the solenoid valves 270 and 280. In the event of a loss of power, the system continues to operate without any intervention. Should a catastrophic event occur, which may include a power outage, the system remains in a state of readiness, ready to provide reliable operation in closing the valve when the panic switch 260 is depressed.

When an emergency situation is detected and there is need to disrupt the flow of fluid, typically the operator depresses the panic switch 260. Depressing the panic switch applies power to the coils 270a and 280a of solenoids 270 and 280, where solenoid valve 270 opens, permitting the stored carbon dioxide gas to inflate the air bladder 130, while simultaneously closing solenoid valve 280, shutting of the venting to the atmosphere. As the air bladder inflates, it causes the vane 120 to rotate approximately ninety degrees, thereby closing the connected existing valve, until it trips the travel limit switch 250. This switch is a normally closed switch and when operated, disrupts the flow of current to the coil of solenoid valve 270, thereby ceasing the flow of gas from the pressurized source 290.

In another aspect of the invention, the system may include an automated actuation means that would provide hazardous gas sensors (not shown in the drawing), the sensors on the circuit communicating with solenoids 270 and 280 to actuate the system upon detection of a hazardous gas.

Figure 10:
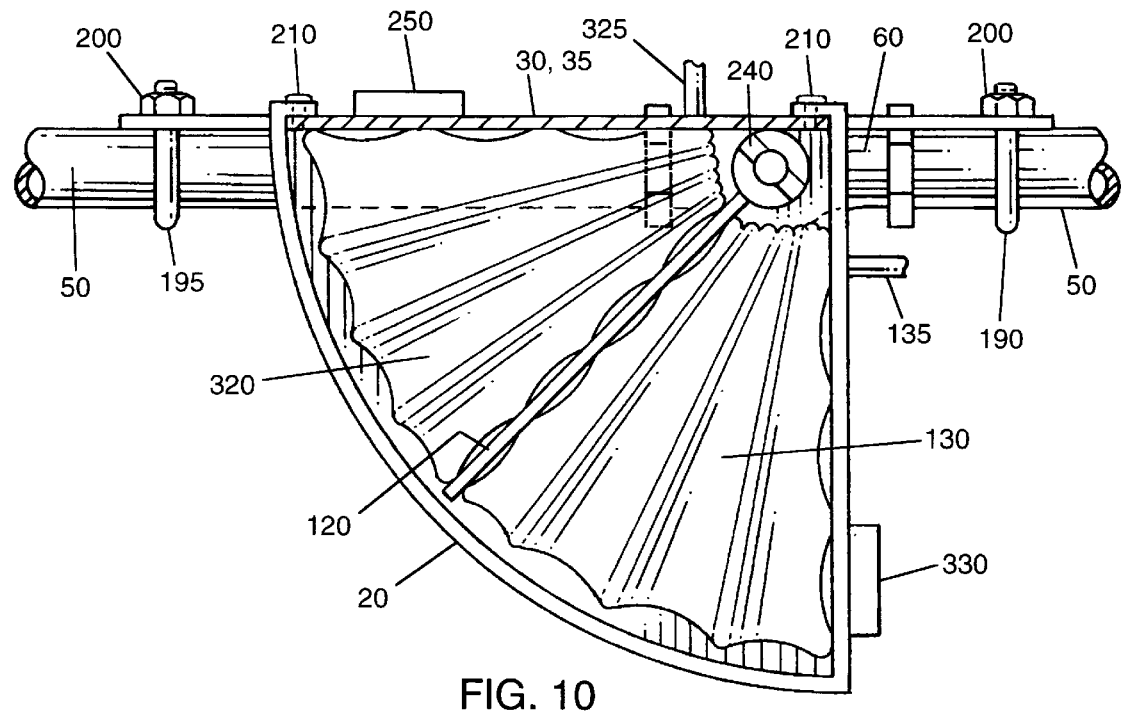
FIG. 10 is a top elevation that shows the detailed construction of the improved valve actuating apparatus having two expandable air bladders to form a double acting rotary actuator. It is shown in a position where each expandable air bladder is partially inflated, with the actuated valve in approximately mid-position.

An alternative embodiment of the present invention provides a dual-acting valve actuator that resets the system. As shown in FIG. 10, there is the addition of another air bladder 320 to provide a remote means of resetting the actuated valve 60. A second travel limit switch 330, that is serially connected with reset travel limit switch 250, interrupts the flow of current to the coil of solenoid valve 270, thereby causing the flow of gas from the pressurized source to cease. This double acting actuator is shown in a position where each expandable air bladder is partially inflated, with the actuated valve in approximately mid-position.

The preferred embodiment of this invention has been set forth for the purpose of disclosing a valve closure apparatus in the context of it providing remote operation that is self-sufficient in operation. However, it will become apparent to those skilled in the art that the present invention may be used in other contexts as may be deemed appropriate without departing from the scope of the invention contained herein. Since other modifications and changes may be varied to conform to other operating requirements, the invention is not limited to the specific embodiments that were chosen for the purposes of disclosure, and covers all changes or modifications which do not constitute departures from the true spirit of the invention. In this regard, modifications to the preferred embodiment may occur to those skilled in the art, but should not detract from the embodiment disclosed.

The claims that are appended are intended to cover all of the embodiments that do not depart from the scope of the present invention.

What is claimed is:

1. A single-acting valve actuator system for use with a standard gas pipeline valve of a type having open and closed positions, with a normally open position, and an integral valve stem operable by a ninety degree turn thereof to close the valve, the system adapted for detection of hazardous gas, and to automatically shut off a pipeline gas flow by valve closure, the system comprising:

a quadrant shaped housing mounted on a pipeline and positioned over an in-line valve thereof;

a circuit with a power source, a vessel containing a pressurized fluid communicating with a pneumatic drive means engaging the valve stem, the pneumatic drive means communicating with the vessel through a normally closed and a normally open solenoid;

a panic switch for closure of the circuit to reverse condition of the solenoids for entry of the pressurized fluid to the pneumatic drive means that rotatably drives the valve to a closed position when the system is activated upon detection of an emergency situation; and, a travel limit switch in the housing and communicating with said normally closed solenoid valve for cessation of the pressurized fluid to the pneumatic drive means.

2. The valve actuator system according to claim 1, wherein the power source is a self-contained, integral power source that is independent from any other external power sources, such that in the event of a power loss, the system will remain in a condition of operative readiness without any intervention; and, wherein the housing member centrally straddles the pipeline and in-line valve.

3. The valve actuator system according to claim 2, wherein the self-contained, integral power source comprises a rechargeable battery that includes a charge maintenance means for supplying electrical power to operate the system.

4. The valve actuator system according to claim 3, the charge maintenance means of the self-contained, integral power source comprising a trickle charger that is associated with the rechargeable battery, the trickle charger to maintain a charge on the rechargeable battery.

5. The valve actuator system of claim 4, wherein the panic switch is manually activated.

6. The valve actuator system of claim 5, further comprising hazardous gas sensors communicating on the circuit with the panic switch, whereby the panic switch is also automatically activated, for automatic valve closure concomitant with detection of a hazardous gas.

7. The valve actuator system of claim 6, the housing including an enclosure assembly that defines a rotative chamber for the pneumatic drive means.

8. The valve actuator system of claim 7, the enclosure assembly comprising upstream and downstream side walls, upper and lower plates, and a cylinder shaped enclosure interconnecting the walls that complete the chamber.

9. The valve actuator system of claim 8, further comprising a rotatable shaft positioned near an intersection of the side walls, the shaft arising vertically from the pipeline, coaxial and in articulation with the stem, and having a rotating vane fixed to said shaft and extending radially from the shaft within the chamber.

10. The valve actuator system described in claim 9, the pneumatic drive means comprising a bladder confined in the chamber between the vane and the upstream side wall of the housing, a bladder inflation force on the vane concurrent by switch activation, a commensurate torque to the shaft and a consequent rotation of the stem for a remote valve closure.

11. The valve actuator system of claim 10, further comprising a support member that is fixed to the housing and further secured to the pipeline, for mounting the actuator to the pipeline while straddling the valve.

12. The valve actuator system of claim 11, the shaft having first and second ends, the first end having a valve stem receiving slot that engages the valve stem.

13. The valve actuator system of claim 12, the shaft second end having a parallel sided stem that forms a remote valve stem to manually close and reopen the valve.

14. The valve actuator system of claim 13, the air bladder having peripheral surfaces and, further comprising expandable bellows on said surfaces.

15. The valve actuator system of claim 14, wherein the bladder bellows are formed of a laminate of a first material comprising silicone rubber covered by a second material that comprises a cut-resistant fabric layer.

16. The valve actuator system of claim 15, wherein the second cut-resistant material comprises Kevlar.

17. The valve actuator system of claim 16, wherein the bellows comprises a quadrant-shaped piece, that interfits in the chamber when the air bladder is fully expanded.

18. The valve actuator system of claim 17, the bladder further comprising an inlet communicating with the vessel to receive a pressurized fluid from the vessel into the bladder when an emergency condition is detected.

19. The valve actuator system of claim 18, wherein the vane is welded to the shaft.

20. The valve actuator system of claim 19, the housing further comprising an upper bearing slotted hole in the upper plate and a lower bearing slotted hole in the lower plate, and the shaft having annular grooves near said first and second ends thereof, each of the grooves captivated in a corresponding slotted hole for retention of the shaft in the housing.

21. A valve actuator system according to claim 17, further comprising an electronic actuation means on the circuit to automatically commence operation of the system for remote valve closure.

22. A valve actuator system according to claim 21, wherein the electronic actuation means comprises hazardous gas sensors in communication with the solenoids to actuate the system upon detection of a hazardous gas.

23. A dual-acting valve actuator system that mounts to an existing gas pipeline valve having open and closed positions, with a normally open position, and an integral valve stem operable by a ninety degree turn thereof to close the valve when a hazardous condition is detected, then reopen and reset the valve, the system comprising:

a circuit with a power source having a trickle re-charger, a vessel containing a pressurized fluid communicating with a first pneumatic drive means mounted on the pipeline, engaging the valve stem, positioned against a first downstream side of a rotatable vane, and communicating with a normally closed and a normally open solenoid, and a first travel limit switch in communication with said normally closed solenoid and positioned for contact by the vane;

a panic switch for closure of the circuit to reverse condition of the solenoids for entry of the pressurized fluid to the pneumatic drive means that rotatably drives the valve to a closed position when the system is activated upon detection of an emergency situation; and, a second pneumatic drive means positioned against a second upstream side of the rotatable vane and communicating with the vessel through the solenoids situation including a second travel limit switch serially connected with the first limit switch, to automatically reopen and reset a closed valve upon conclusion of the emergency.

24. A rotary actuator valve closure apparatus, comprising;
a housing including first and second end walls, upper and lower plates and a rounded barrier interconnecting said first and second walls to form a chamber essentially shaped as a quadrant of a cut cylinder;
means for mounting the housing on a fluid pipeline valve having a valve stem;
further comprising a rotatable shaft within the housing, the shaft having a grooved first end that engages the stem, a flattened second end projecting upward from the chamber, and a rigid vane projecting radially from the shaft, for a sweep along a perimeter of the quadrant between the walls;
a pneumatic drive means in communication with a compressed air source, that converts a linear pneumatic force on the vane to a rotation torque force on the stem, whereby the pipeline valve is automatically rotated for automatic valve closure upon detection of a hazardous gas by the system.

25. The valve closure apparatus of claim 24, the means for mounting comprising the housing secured to a frame member having holes therethrough to receive corresponding U-bolts fitted tightly on the pipeline with the actuator positioned to straddle the valve.

26. The valve closure apparatus of claim 25, the shaft further comprising an annular groove near each of the ends thereof, the upper and lower plates each having a corresponding slotted hole to captivate said shaft within the housing.

27. The apparatus of claim 26, the drive means comprising a wedge shaped inflatable bladder confined in the quadrant between the vane and the first wall, the bladder having an expandable broad wedge bellows wall and an inlet for input of a compressed fluid concomitant with detection of a hazardous condition to force the vane in a sweep motion within the quadrant, for consequent torque on the shaft and stem, with resultant closure of the valve.

28. The actuator of claim 27, further comprising a circuit with a battery having a trickle charger, a compressed air source in fluid communication with the bladder, and a trigger means on the circuit for immediate actuation of the apparatus and remote valve closure when a hazardous condition is detected.

29. The actuator of claim 28, further comprising an automatic means for resetting the apparatus.

30. The actuator of claim 28, further comprising a means for manually resetting the apparatus.

* * * * *